US011304511B2

(12) United States Patent
Sauvage et al.

(10) Patent No.: US 11,304,511 B2
(45) Date of Patent: Apr. 19, 2022

(54) ERGONOMIC KEYBOARD SYSTEM

(71) Applicant: Logitech Europe S.A., Lausanne (CH)

(72) Inventors: Sylvain Sauvage, La-Tour-de-Peliz (CH); Maxence Perret-Gentil, Suzhou (CN); Lars Holm Lauridsen, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 8 days.

(21) Appl. No.: 16/681,560

(22) Filed: Nov. 12, 2019

(65) Prior Publication Data

US 2021/0137262 A1 May 13, 2021

(51) Int. Cl.
A47B 21/03 (2006.01)
G06F 3/02 (2006.01)
G06F 3/0346 (2013.01)
G06F 3/01 (2006.01)

(52) U.S. Cl.
CPC ........ *A47B 21/0371* (2013.01); *G06F 3/0216* (2013.01); *A47B 2021/0392* (2013.01); *G06F 3/011* (2013.01); *G06F 3/0346* (2013.01); *G06F 2203/011* (2013.01)

(58) Field of Classification Search
CPC .. G06F 1/1632; G06F 1/1669; G06F 3/03541; G06F 3/03543; G06F 3/03549; G06F 1/1616; G06F 1/162; G06F 1/1626; G06F 1/1628; G06F 1/1654; G06F 1/1656; G06F 1/1662; G06F 1/167; Y10T 29/49826; A47B 23/043; B23P 19/00; F16M 11/10; F16M 11/38; F16M 13/00; H05K 5/02

USPC .................................................. 345/156–169
See application file for complete search history.

(56) References Cited

U.S. PATENT DOCUMENTS

| 5,490,647 | A | * | 2/1996 | Rice | G06F 3/03543 248/118.1 |
| 5,689,253 | A | * | 11/1997 | Hargreaves | B41J 5/10 341/22 |
| 6,822,854 | B2 | * | 11/2004 | Te Maarssen | G06F 3/0202 361/679.19 |
| 2002/0117589 | A1 | * | 8/2002 | Ruan | A47B 21/0371 248/118.5 |
| 2004/0234319 | A1 | * | 11/2004 | Lee | G06F 3/0208 400/714 |
| 2006/0192415 | A1 | * | 8/2006 | Steenson | A47C 7/68 297/161 |

(Continued)

*Primary Examiner* — Kwin Xie
(74) *Attorney, Agent, or Firm* — Kilpatrick Townsend & Stockton LLP

(57) ABSTRACT

An ergonomic keyboard apparatus comprising a keyboard frame including an ergonomic contour defined in part by a gabled portion of the keyboard frame that is pitched into a contoured peak that forms a first slope and a second slope on either side of the keyboard frame. A plurality of keys are disposed within the keyboard frame such that key tops of each of the plurality of keys follow the ergonomic contour of the keyboard frame. A wrist pad coupled to the keyboard frame has a gabled center portion and a surface contour that corresponds to the ergonomic contour of the keyboard frame defined by its gabled portion, first slope, and second slope. Each location along at least a portion of the surface contour of the wrist pad is elevated to at least a height of corresponding key tops of the plurality of keys.

20 Claims, 10 Drawing Sheets

(56) References Cited

U.S. PATENT DOCUMENTS

| | | | | |
|---|---|---|---|---|
| 2006/0274045 | A1* | 12/2006 | Stenbroten | G06F 3/0219 345/168 |
| 2006/0275069 | A1* | 12/2006 | Jones | G06F 3/0216 400/490 |
| 2007/0285395 | A1* | 12/2007 | Hargreaves | G06F 3/0208 345/168 |
| 2012/0111173 | A1* | 5/2012 | Bowen | G06F 3/0219 84/170 |
| 2014/0266812 | A1* | 9/2014 | Rajkowski | G06F 3/0234 341/22 |

* cited by examiner

KINEMATICS

STANDARD KEYBOARD 532

510

NEW DESIGN 534

300

Negative Tilt to Reduce Wrist Extension

542

510

544

300

Gable to Reduce Forearm Pronation

300

510

552

554

Split to Reduce Wrist Deviation

ERGONOMIC KEYBOARD SYSTEM

BACKGROUND

Input devices for modern computer systems are typically used to convert analog inputs (e.g., touches, clicks, motions, gestures, button presses, etc.) into digital signals for computer processing (e.g., Human Interface Device (HID) commands). An input device can include any device used to provide data and control signals to an information processing system such as a computer. Some non-limiting examples of input devices include keyboards, key pads, computer mice, remote controls, gaming controllers, joysticks, trackballs, and the like.

Input devices, such as keyboards, are typically designed for comfort in addition to their utilitarian use of providing a user interface for alphanumeric input. Over the past several decades, many enhancements have been made to improve the ergonomics of keyboards. For instance, keyboards have been fitted with improved key structures for better feel and reliability, improved lighting (e.g., backlighting, individual key lighting) for easier key identification in low light environments, wireless capabilities for untethered usage, visual (e.g., embedded displays) and haptic feedback, and the like.

Many notable ergonomic improvements have been made over the last several years. In addition to more comfortable keys, keyboards have been shaped in a number of ways to reduce strain on users. Some of these improvements include adding a wrist pad for supporting a user's wrist while the keyboard is in use, forming a contour of the surface of the keyboard into a wave shape for improved comfort, and more. An exemplary embodiment of an ergonomic keyboard is the "Curved keyboard with Wave-Shaped Key Height Variation to Accommodate Natural Finger Positions" as described in U.S. Pat. No. 8,721,204. Despite the many advantages provided by such ergonomic products, further developments are needed.

BRIEF SUMMARY

In some embodiments, an ergonomic keyboard apparatus comprises a keyboard frame including an ergonomic contour defined in part by a gabled portion of the keyboard frame that is pitched into a contoured peak that forms: a first slope on a first side of the keyboard frame that slopes from the first side up towards the contoured peak of the gabled portion along a contoured first axis; and a second slope on a second side of the keyboard frame that slopes from the second side up towards the contoured peak of the gabled portion along the contoured first axis; a plurality of keys housed by the keyboard frame, wherein the plurality of keys are disposed within the keyboard frame such that key tops of each of the plurality of keys follow the ergonomic contour of the keyboard frame; and a wrist pad coupled to the keyboard frame, the wrist pad having a gabled center portion and a surface contour that corresponds to the ergonomic contour of the keyboard frame defined by the gabled portion, first slope, and second slope of the keyboard frame. Each location along at least a portion of the surface contour of the wrist pad can be elevated to at least a height of corresponding key tops of the plurality of keys located relative to the wrist pad along a second axis substantially orthogonal to the contoured first axis, wherein the at least a portion of the surface contour corresponds to an area configured to support a user's wrists or palms while the ergonomic keyboard apparatus in in use. The wrist pad can include: a first wrist support region; and a second wrist support region, the first and second wrist support region configured to support a user's wrists while the ergonomic keyboard apparatus is in use, where the first and second slopes of the keyboard frame and the wrist pad may be at least |10°| at their steepest sections, and wherein the first and second wrist support regions maintain at least a 2 degree slope throughout.

In certain embodiments, the wrist pad may be configured to be non-destructively detachable from and re-attachable to the contoured keyboard. The wrist pad can be configured such that a distance between the wrist pad and the plurality of keys is adjustable. The wrist pad may include a front portion that couples to the keyboard frame and a rear portion opposite to the front portion, and the wrist pad may include an integrated and adjustable kickstand configured to pitch the rear portion of the wrist pad relative to the front portion along the second axis when the kickstand is deployed. The adjustable kickstand may pitche the rear portion of the wrist pad up to 7°.

In some embodiments, the ergonomic keyboard apparatus may comprising one or more sensors embedded within the wrist pad, the one or more sensors configured to: detect a location of the user's wrists while the keyboard is in use; and detect whether the integrated kickstand is deployed. In some cases, the pitch of the contoured peak of the gabled center portion is adjustable. The wrist pad may be detachable from the keyboard frame and can be foldable. The plurality of keys can include at least one set of home keys, where a center of each home key is 15 cm from a bottom edge of the surface contour of the wrist pad at a location in-line with a line defined by an orientation of the corresponding home key. The home keys may include the "asdf" and "jkl;" keys in a QWERTY keyboard layout. A typing surface of each of the home keys (where the user depresses the keys) can have an 18.5 mm by 18.5 mm pitch. In some aspects, there is 102 mm distance between a center of the 'j' home key and the center of a 'backspace' key, and 92 mm distance between the center of the T key and a center of an 'enter' key.

In further embodiments, an apparatus comprises: a wrist pad configured to be coupled to an ergonomic keyboard, the wrist pad having a gabled center portion and a surface contour that corresponds to an ergonomic contour of the keyboard, where the gabled portion of the wrist pad is pitched into a contoured peak that forms: a first slope on a first side of the wrist pad that slopes from the first side up towards the contoured peak of the gabled portion along a contoured first axis; and a second slope on a second side of the wrist pad that slopes from the second side up towards the contoured peak of the gabled portion along the contoured first axis; where at least a portion of the surface contour of the wrist pad is elevated to at least a height of corresponding key tops of a plurality of keys disposed in the ergonomic keyboard and located relative to the wrist pad along a second axis substantially orthogonal to the contoured first axis on the ergonomic keyboard, wherein the at least a portion of the surface contour corresponds to an area configured to support a user's wrists or palms while the ergonomic keyboard is in use. The wrist pad can include: a first wrist support region; and a second wrist support region, the first and second wrist support region configured to support a user's wrists while the ergonomic keyboard is coupled to the wrist pad and in use, where the first and second slopes of the wrist pad are at least |10°| at their steepest sections, and wherein the first and second wrist support regions maintain at least a 2 degree slope throughout.

In certain embodiments, the wrist pad can be configured to be non-destructively detachable from and re-attachable to the contoured keyboard. The wrist pad can be configured such that a distance between the wrist pad and the ergonomic keyboard is adjustable. The wrist pad can include a front portion that couples to the ergonomic keyboard and a rear portion opposite to the front portion, and wherein the wrist pad includes an integrated and adjustable kickstand configured to pitch the rear portion of the wrist pad relative to the front portion when the kickstand is deployed. The adjustable kickstand may pitch the rear portion of the wrist pad up to 7°. In some cases, the apparatus may comprise one or more sensors embedded within the wrist pad, the one or more sensors configured to: detect a location of the user's wrists while the keyboard is in use; and detect whether the integrated kickstand is deployed.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

DETAILED DESCRIPTION

Aspects of the present disclosure relate generally to human interface devices, and more particularly to ergonomic keyboards and palm/wrist support systems, according to certain embodiments.

In the following description, various examples of ergonomic keyboards and wrist support systems are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

To following high level summary is intended to provide a basic understanding of some of the novel innovations depicted in the figures and presented in the corresponding descriptions provided below. Aspects of the invention relate to an ergonomic keyboard and wrist/palm support system that contributes to better user posture and kinematics for a more comfortable user interface that may reduce wrist strain over long periods of use. Wrist strain may be caused by a number of factors including prolonged wrist deviation, forearm pronation, and wrist extension, while using a keyboard as further described below with respect to FIGS. 4A-4C. Thus, a technical problem that beleaguers many conventional keyboard designs is how to create a keyboard that is highly functional and promotes efficient usage, and yet provides ergonomic advancements that do not hinder user efficiency and maintain good user kinematics over extended periods of time. Certain embodiments of the invention provide a technical solution in a new ergonomic keyboard (see, e.g., FIGS. 3A-10) that can reduce, and in some cases eliminate, these deleterious physical conditions that can be more pronounced with long term use by introducing certain contours in the keyboard system that operate to place a user's wrists and hands in a more beneficial (less strenuous) orientation while the keyboard is in use.

Figure 6:
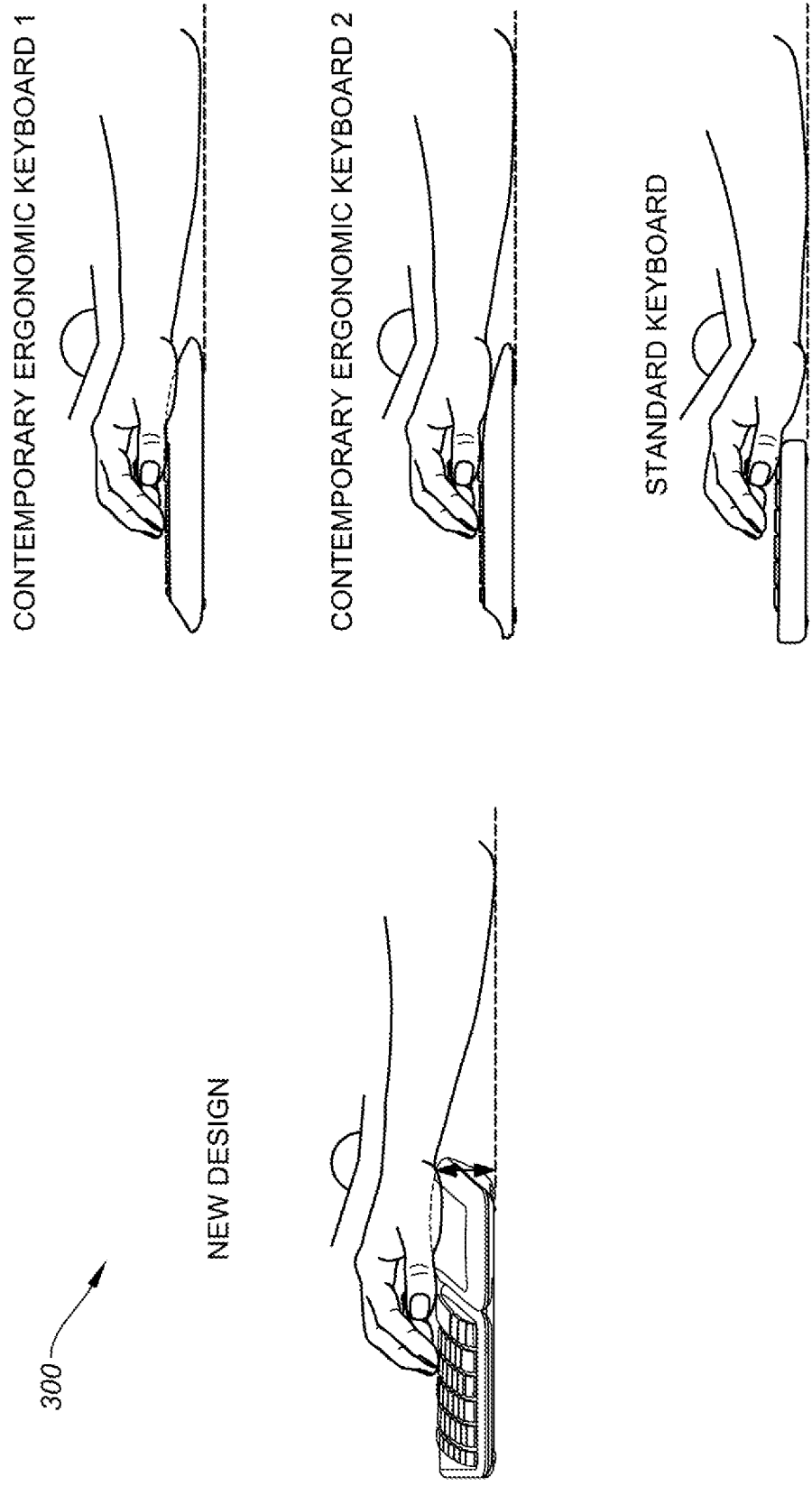
FIG. 6 shows a kickstand configured to generate kinematic improvements in wrist extension in an ergonomic keyboard and wrist support system, according to certain embodiments.
Figure 7:
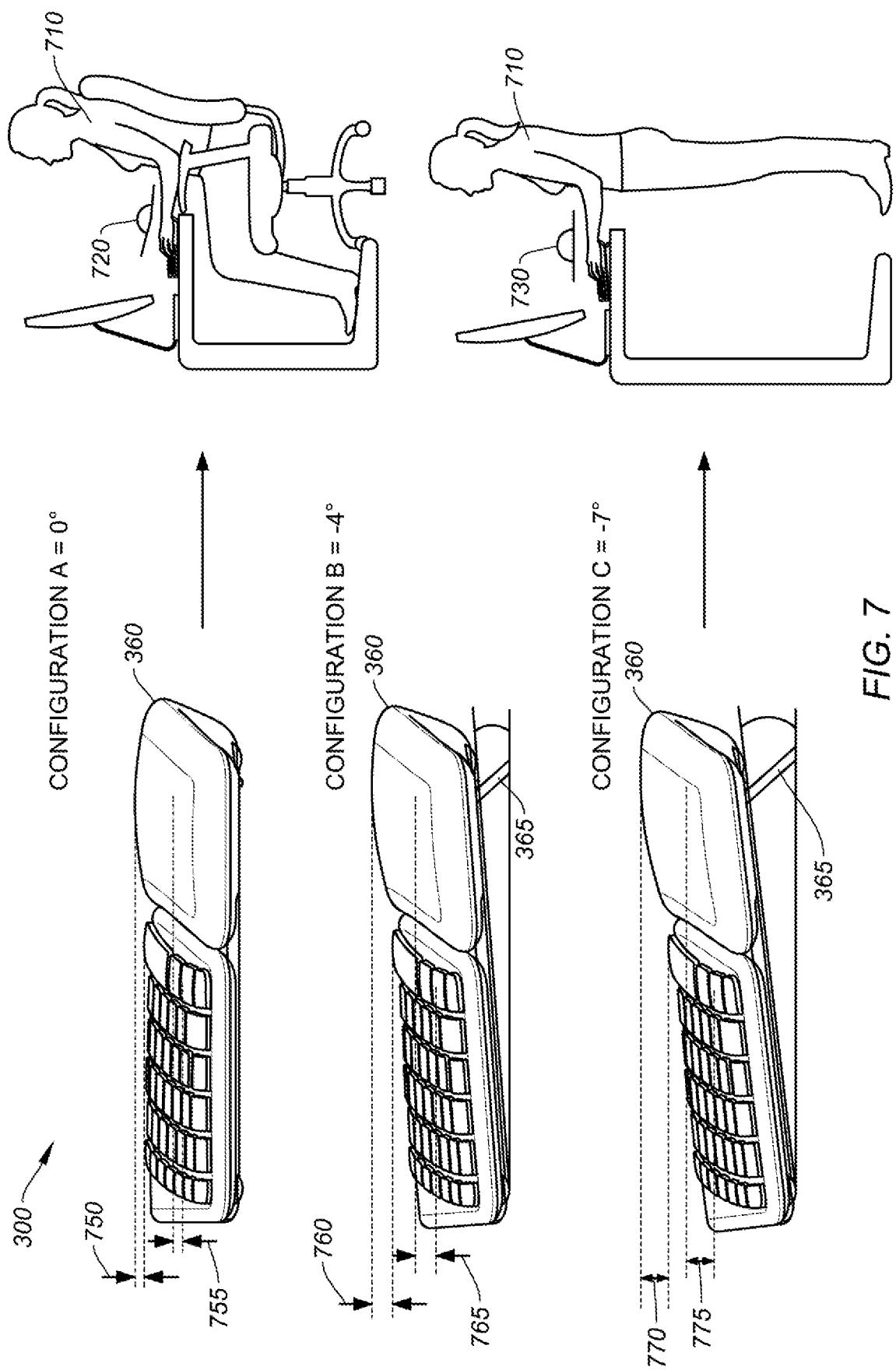
FIG. 7 shows the use of an integrated kickstand configured to generate kinematic improvements in wrist extension in an ergonomic keyboard and wrist support system, according to certain embodiments.

In some embodiments, wrist extension and flexion can be reduced by incorporating a negative tilt in the wrist pad (also referred to as a "wrist rest," "palm rest," "palm pad," "wrist support," and "palm support") to achieve a neutral wrist position, as shown in FIGS. 6-7. This may be achieved by adjusting a height of the wrist pad by way of a kickstand (see, e.g., FIG. 7) and/or by constructing the wrist pad such that each location along the surface contour of the wrist pad is elevated to at least a height of corresponding key tops of the plurality of keys (or higher), as shown in FIG. 7. In some cases, the kickstand may have one or more discrete settings (e.g., 0°, −4°, −7°, etc.) or a continuous range of settings. In some implementations, the wrist pad may be detachable and, in some cases, foldable once detached from the keyboard housing. Some detachable implementations may be adjustably coupled to the keyboard housing such that a distance between the wrist pad and the keys can be adjusted.

In certain embodiments, wrist pronation and supination (e.g., as shown in FIG. 4) can be reduced by introducing a gabled keyboard and corresponding gabled wrist pad, as shown and further described below at least in FIGS. 8-9. The gabled portion (e.g., a "peak" centered between the "G" and "H" keys) can operate to cause a user's wrist to rest in a more neutral position (closer to a "handshake" position) while the keyboard is in use by way of the slopes on either side of the gabled portion of the wrist pad. Some embodiments may employ an adjustable gable that can control the height and slope of the gable of the keyboard, wrist pad, or both.

In some aspects, wrist deviation (ulnar and radial deviation) can be reduced by "splitting" the layout of the keys on the keyboard and shape of the wrist pad in a manner that allows the user's wrists and forearms to rest in a more neutral manner, as shown and described below at least with respect to FIG. 8. Some embodiments may incorporate one or more sensors embedded within the wrist pad that may be configured to a location of a user's wrists/palms on the palm rest while the keyboard is in use, detect when the wrist pad kickstand(s) are deployed, etc., which can be used to analyze a user's kinematics and make recommendations to help improve a user's posture.

Figure 1:
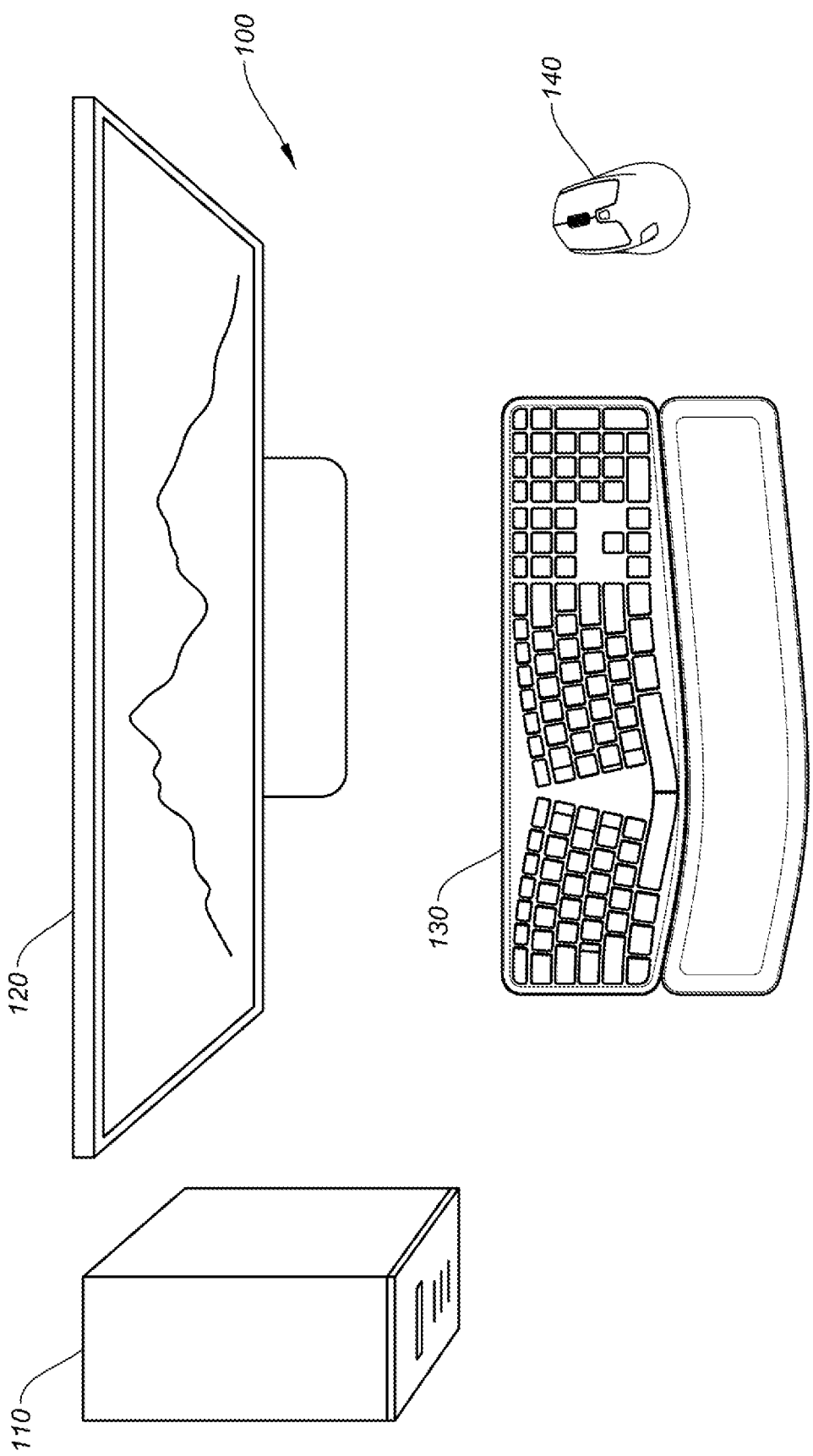
FIG. 1 shows a simplified diagram of a computer system, according to certain embodiments.

FIG. 1 is a simplified diagram of a computer system 100, according to certain embodiments. Computer system 100 can include a computer 110, display device 120, keyboard 130, and computer mouse 140. In embodiments, keyboard 130 can be any suitable device capable of being used to convert analog input signals into digital signals for computer processing. As an example, keyboard 130 may be a input device with a plurality of keys that can be pressed to effectuate a key press. The key press may cause a corresponding input to be generated in computer system 100. For computer system 100, keyboard 130 and mouse 140 can be configured to control aspects of computer 110 and monitor 120.

In some embodiments, computer 110 may include a machine readable medium (not shown) that is configured to store non-transitory, computer-readable computer code, such as keyboard driver software, and the like, where the computer code is stored in a memory device and is executable by a processor of the computer 110 to affect control of the computer 110 by keyboard 130. The various embodiments described herein (e.g., in FIGS. 3A-10) generally refer to keyboard 130, or similar input device, however it should be understood that keyboard 130 can be any input/output (I/O) device, user interface device, control device, input unit, or the like. Note that computer 110 can also be referred to as a "host computer" or "host computing device."

The host computing device is typically described as a desktop or laptop computing device. However, it should be understood that the host computing device can be any suitable computing device further including a tablet computer, a smart phone, a virtual or augmented reality interface (e.g., having 2D or 3D displays such as a head mounted display), a holographic interface, or the like. One of ordinary skill in the art would understand the many variations, modifications, and alternative embodiments thereof.

Figure 2:
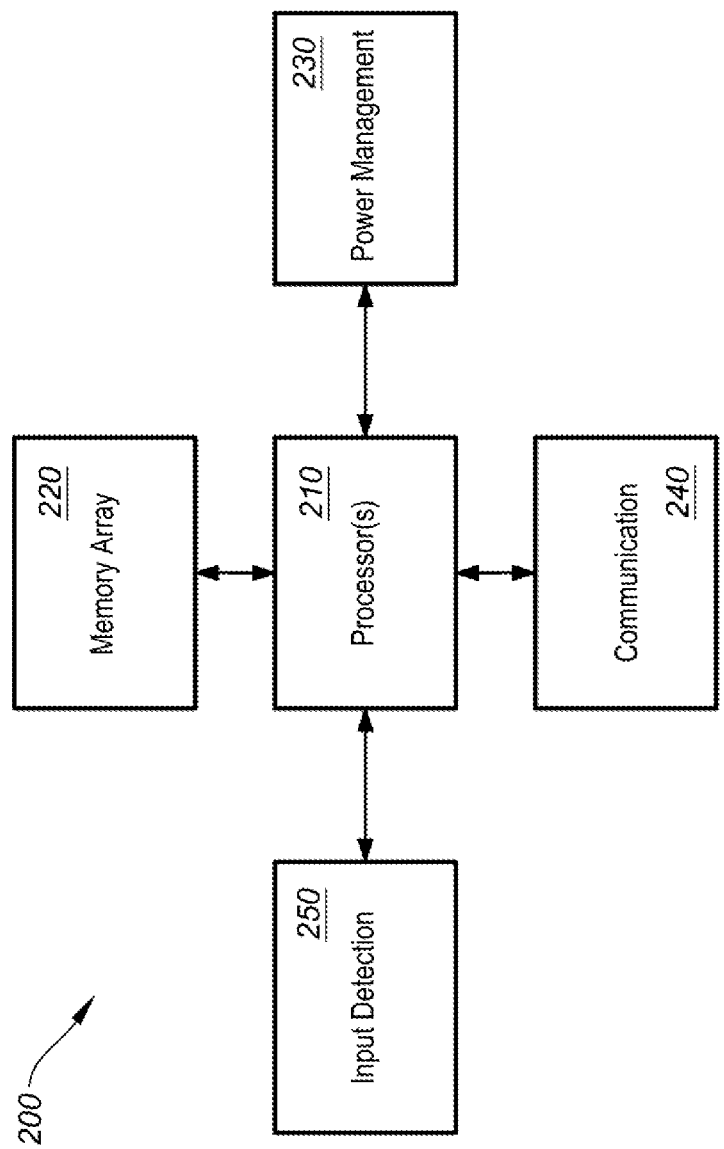
FIG. 2 shows a simplified block diagram of a system configured to operate an ergonomic keyboard and wrist support system, according to certain embodiments.

FIG. 2 shows a simplified block diagram of a system configured to operate an ergonomic keyboard and wrist support system (130, 300), according to certain embodiments. System 200 includes processor 210, memory array 220, power management system 230, communication system 240, and input detection system 250. Each of the system blocks 220-250 can be in electrical communication with processor 210. System 200 may further include additional systems and/or subsystems that are not shown or discussed to prevent obfuscation of the novel features described herein, such as haptic and/or lighting output control blocks, bus control systems to transfer power or data to and from different subsystems (e.g., 210-250), or the like, and such systems may be standalone systems (e.g., system blocks, individual processors), performed by processor 210, or a combination thereof, as would be appreciated by one of ordinary skill in the art with the benefit of this disclosure.

In certain embodiments, processor(s) 210 comprises one or more microprocessors (μCs) and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of input device 140 (e.g., system block 220-250). Alternatively or additionally, some of system blocks 220-250 may include an additional dedicated processor, which may work in conjunction with processor 210. One of ordinary skill in the art would understand the many variations, modifications, and alternative embodiments thereof.

Memory array 220 may be configured to store information pertaining to keys of a keyboard. For instance, memory array 220 can include stored input values associated with corresponding keys of keyboard 140, as would be understood by one of ordinary skill in the art. Additionally, memory array 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

Power management system 230 can be configured to manage power distribution, recharging, power efficiency, and the like, for keyboard 130 and its corresponding systems 210, 220, 240, 250, etc. In some embodiments, power management system 230 can include a battery (not shown), a USB based recharging system for the battery (not shown), and power management devices (e.g., low-dropout voltage regulators—not shown). In certain embodiments, the functions provided by power management system 230 may be incorporated into processor 210. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use the mouse's USB connection to recharge the battery.

Communications system 240 can be configured to enable wireless communication between keyboard 130 and computer 110, or other devices and/or peripherals (e.g., input device 140), according to certain embodiments of the invention. Communications system 240 can be configured to provide radio-frequency (RF), Bluetooth®, infra-red (IR), ZigBee®, or other suitable communication technology to communicate with other computing devices and/or peripheral devices. System 200 may optionally comprise a hard-wired connection to computer 110. For example, keyboard 140 can be configured to receive a Universal Serial Bus (USB) cable to enable bi-directional electronic communication with computer 110 or other external devices. Some embodiments may utilize different types of cables or connection protocol standards to establish hardwired communication with other entities.

Input detection module 250 can control the detection of a user-interaction with input elements on keyboard 130. For instance, input detection module 250 can detect key presses on the various keys of keyboard 130 (e.g., QWERTY keys, function keys, number pad keys, etc.), or other suitable input elements such as media control buttons, communication buttons, touch sensors (e.g., touch pads) and the like. In some cases, input detection module 250 can detect control and/or detect sensor signals from one or more sensors from the wrist pad in keyboard 130, as further described below at least with respect to FIG. 10. In some embodiments, input detection module 250 can work in conjunction with memory array 220 to detect inputs on keyboard 130 and associate various functions with each input element, as would be appreciated by one of ordinary skill in the art with the benefit of this disclosure.

It should be appreciated that system 200 is illustrative and that variations and modifications are possible. System 200 can have other capabilities not specifically described herein. Further, while system 200 is described with reference to particular blocks (also referred to as "modules"), it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. As such, the foregoing embodiments are not intended to be limiting and those of ordinary skill in the art with the benefit of this disclosure would appreciate the myriad applications and possibilities.

Figure 3A:
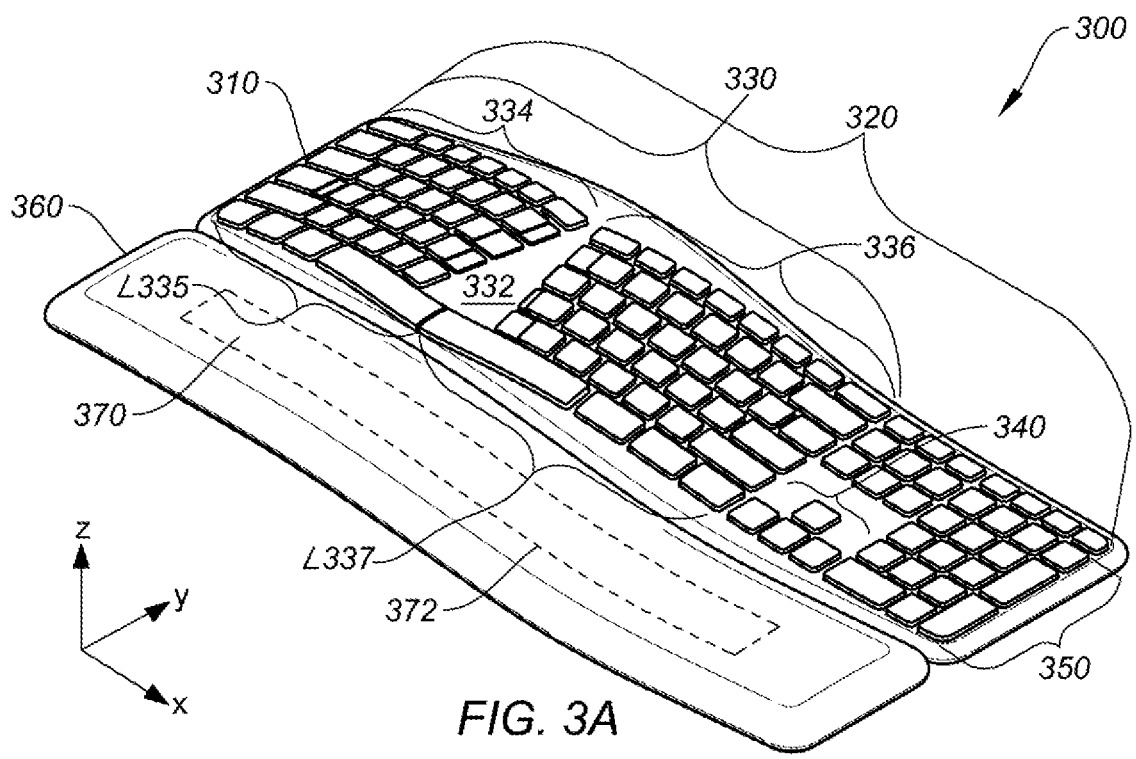
FIG. 3A shows an ergonomic keyboard and wrist support system, according to certain embodiments.

FIG. 3A shows an ergonomic keyboard and wrist support system ("keyboard system") 300, according to certain embodiments. Keyboard system 300 includes a keyboard portion ("keyboard") 310 and a wrist pad portion ("wrist pad") 360 having a wrist pad surface 370. Keyboard 310 can include a number of depressible buttons 320 (e.g., alphanumeric keys, number pad keys, function keys, or any other type of key, button, switch, touch sensitive sensor array, or the like) that include alpha numeric keys 330, arrow key section 340, and number pad section 350. A split region 332 between the 'G' and 'H' keys is defined by a contoured gabled region, as further describe below at least with respect to FIGS. 5 and 7. Depressible buttons 320 may include any suitable shape, size, or configuration. Buttons may include scissor-type key structures, dome structures, butterfly key structures, or other suitable type of mechanical and/or capacitive key structures/surfaces.

Keyboard system 300 is ergonomically contoured to reduce user strain and fatigue that can occur during long term use, which is problem in many conventionally designed keyboards. The various contours and dimensions in keyboard system 300 (e.g., including keyboard 310 and wrist pad 360) can operate to reduce or eliminate at least wrist deviation, forearm pronation, and wrist extension, as further described below with respect to FIGS. 4A-9.

Keyboard system 300 can include one or more sensors disposed within wrist pad 360 that can detect when keyboard system 300 is in use, weight and weight distribution of a user's hands/wrists/palms on the wrist pad portion, the amount of time that keyboard system 300 is in use and corresponding timing metrics (e.g., time of total use, continuous use, length of breaks between use), how the user's hands shift position over time, how the hands shift with respect to certain key stroke (also referred to as "key press") characteristics (e.g., trends in key presses and corresponding kinematics associated therewith, such as whether a user performs non-optimal ergonomic movements when certain keystrokes or combination of keystrokes are performed), or the like. In some embodiments, the relative location of the palms/wrists with respect to one another can be detected, for example, by determining a palm/wrist center of gravity using a force sensor, such as a strain gauge, resistive sensor, piezoelectric sensor, or the like, as would be appreciated by one of ordinary skill in the art with the benefit of this disclosure. Sensor data from a force sensor may be used to detect if the user's wrist angle is too high or too low, which can result in non-optimal ergonomics for the user. Wrist pad 360 may include any suitable surface material including any suitable fabric, polyurethane (PU), rubber, plastic, metal, organic or inorganic material, shape memory polymer (SMP), conductive or non-conductive material, or any combination thereof. The surface of the wrist pad 360 or keyboard 310 may include a coating or covering with directionally dependent frictional properties, such that a user's hand and/or fingers may more easily move along a surface of the coated/covered material in a first direction (e.g., forward and backward relative to the user), but may provide a higher friction (e.g., more resistance) to movements along the surface of the coated or covered material in a second direction (e.g., perpendicular to the first direction).

One or more sensors can be embedded within or on the surface of wrist pad 360. Although FIG. 3A shows a simplified depiction of how sensors could be included within wrist pad 360, any number of sensors, types of sensors, locations of sensors, or orientation of sensors can be implemented, which are further described below with respect to FIG. 10.

Figure 3B:
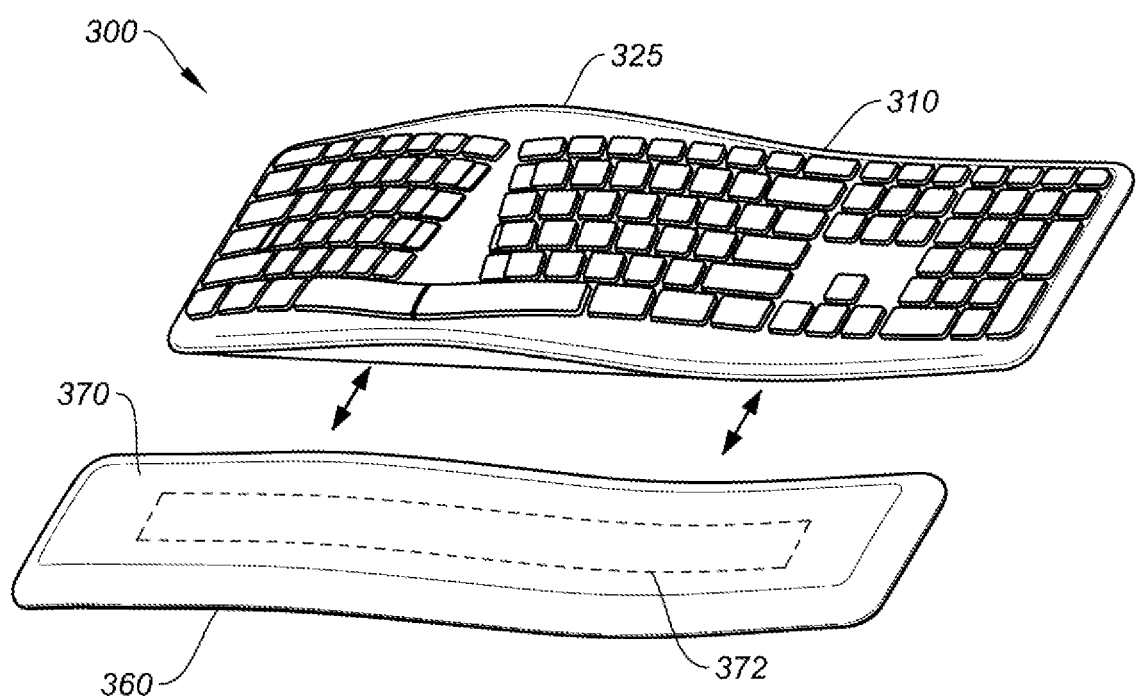
FIG. 3B shows an ergonomic keyboard with a detachable wrist support system, according to certain embodiments.

In some aspects, wrist pad 360 may be removed and reattached to keyboard 310 in a non-destructive manner, as shown in FIG. 3B. Keyboard 310 and wrist pad 360 may be coupled by mechanical elements (e.g., screws, tabs, slots, grooves, or other hardware types), by magnet(s), or a combination thereof, as would be appreciated by one of ordinary skill in the art with the benefit of this disclosure.

By way of example, some embodiments may include a keyboard frame (e.g., the body of keyboard 310) that includes an ergonomic contour defined, in part, by a gabled portion of the keyboard frame that is pitched into a contoured peak that forms: a first slope 335 on a first side of the keyboard frame that slopes from the first side up towards the contoured peak of the gabled portion 325 along a first axis (e.g., x-axis), and a second slope 337 on a second side of the keyboard frame that slopes from the second side up towards the contoured peak of the gabled portion along the first axis. Note that the first axis can be a "contoured" axis where the axis may not be linear, but rather contoured as can be seen in FIGS. 3A-3B and FIG. 5C. A plurality of keys 320 can be housed by the keyboard frame, where the plurality of keys are disposed within the keyboard frame such that key tops of each of the plurality of keys follow the ergonomic contour of the keyboard frame (defined in part by the gable). The wrist pad 360 can be coupled to keyboard frame 310, and the wrist pad can have a gabled center portion and a surface contour 370 that corresponds to (e.g., matches) the ergonomic contour of the keyboard frame defined by the gabled portion, first slope 335, and second slope 337 of the keyboard frame. In some aspects, each location along the surface contour of the wrist pad may be elevated to at least a height of corresponding key tops of the plurality of keys located relative to the wrist pad along a second axis (e.g., y-axis) substantially orthogonal to the first axis. As indicated above, the first axis may be a "contoured" axis (see FIG. 5C). Similarly, the second axis may be contoured as well, however despite the axes have curves to define the ergonomic contours of the ergonomic keyboard system 300, the first and second axes may still be substantially orthogonal at any one location. For example, referring to FIG. 8, the center of the 'F' home key (further discussed below) has a distance 836 to an edge of the wrist pad. The F home key is on a curve defined by the gable and the split of the keyboard, and all of the keys on the F home key row are not linearly displaced. However, they are displaced on a contoured axis and in relation to any particular location along the axis (e.g., for each home key), a surface contour of the wrist pad at a location substantially orthogonal to the first axis at the location of the corresponding key (here, the F home key) may be configured at a height at least as high as the top surface of the particular key. One of ordinary skill in the art with the benefit of this disclosure would understand that the relationship between the first and second axes may be substantially orthogonal at particular relative locations (e.g., home key to surface contour of the wrist pad with a height higher than the surface of the home key), and those axes may be contoured and change as shown and described with respect to the figures presented herein.

Certain embodiments, defined another way, may include an ergonomic keyboard apparatus includes a keyboard frame with an ergonomic contour defined in part by a gabled portion of the keyboard frame that is pitched into a contoured peak. The contoured peak may form a first slope on a first side of the keyboard frame that slopes from the first side up towards the contoured peak of the gabled portion along a first axis (e.g., x-axis), and a second slope on a second side of the keyboard frame that slopes from the second side up towards the contoured peak of the gabled portion along the first axis. A plurality of keys can be housed by and disposed within the keyboard frame such that key tops of each of the plurality of keys follow the ergonomic contour of the keyboard frame. A wrist pad can be coupled to the keyboard frame, where the wrist pad has a gabled center portion and a surface contour that corresponds to (e.g., matches) the ergonomic contour of the keyboard frame defined by the gabled portion, first slope, and second slope of the keyboard frame, and where each location along the surface contour of the wrist pad is elevated to at least a height of corresponding key tops of the plurality of keys located relative to the wrist pad along a second axis (e.g., y-axis) substantially orthogonal to the first axis. Thus the wrist pad may be configured to follow the contour of the key frame and can be raised such that the wrist pad is higher than the keys from the underlying flat work surface, such that even where the wrist pad compresses when a user's hand is placed on it (e.g., foam layer(s) in the wrist pad compress and cause the user's wrist to drop a few millimeters), the user's hand is still at or above the height of the keys, thus reducing or in some cases eliminating wrist extension. Although the embodiments described herein and depicted are keyboards, it should be understood that the same ergonomic concepts can be applied to laptop computers, netbooks, or other input devices with a number of keys designed for user input, as would be appreciated by one of ordinary skill in the art with the benefit of this disclosure.

Figure 4A:
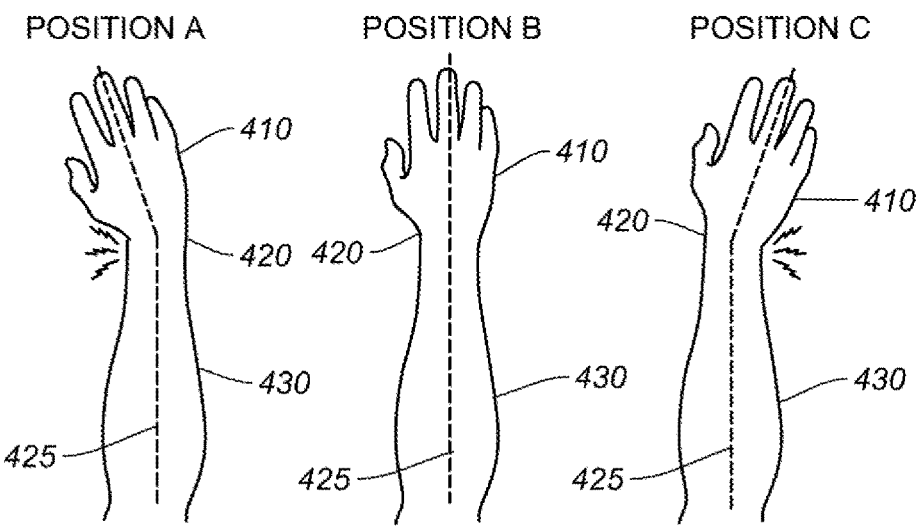
FIG. 4A shows aspects of wrist deviation, which is often caused by conventional keyboard designs, and is reduced or eliminated in certain embodiments of the invention.

FIG. 4A shows aspects of wrist deviation, which is often caused by the use of conventional keyboard designs, and is reduced or eliminated in certain embodiments of the invention. Preferably, a user's hand 410 and wrist 420 should be oriented in-line with their forearm 430 to achieve a neutral position (defined by alignment line 425), which should cause the user to experience the least amount of strain, as shown in position B. In position A, a user's wrist is likely to experience strain, particularly over long term use as the wrist 420 and hand 410 are deviated left of center relative to the forearm 430, which is a non-optimal orientation as described above (note the non-linearity of alignment line 425). This can also be referred to as ulnar and radial deviation and visually appear as a user moving their hand left and right of center relative to the forearm. Position C is likely to produce a similar strain for the user over long term use for similar reasons (ulnar and radial deviation right of center relative to forearm 430. An example showing a user experiencing wrist deviation while using a conventional keyboard and reduced wrist deviation while using keyboard system 300 is presented in FIG. 5C. Note that the terms "stress" and "strain" may mean different things when conventionally used, but these terms can be considered synonymous for the purposes of this disclosure.

Figure 4B:
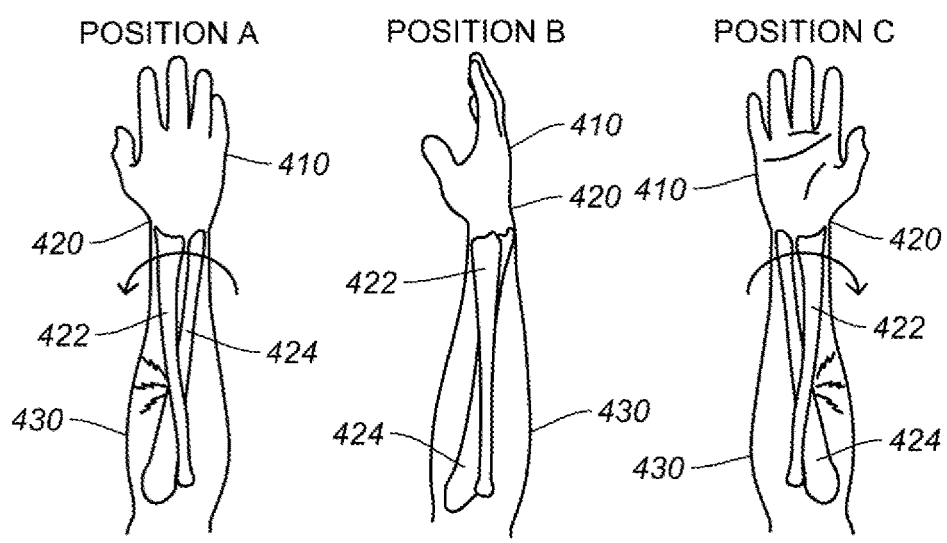
FIG. 4B shows aspects of wrist pronation, which is often caused by conventional keyboard designs, and is reduced or eliminated in certain embodiments of the invention.

FIG. 4B shows aspects of wrist pronation and supination, with pronation being often caused by the use of conventional keyboard designs, which is reduced in certain embodiments of the invention. Preferably, a user's hand 410 and wrist 420 should be oriented in-line with their forearm 430 in a manner that resembles the configuration of the hand 410, wrist 420, and forearm 430 when a person is shaking someone's hand, which is the neutral position (note the alignment of ulnar 422 and radius 424) and should cause the user to experience the least amount of strain, as shown in position B. In position A, a user's wrist is likely to experience strain, particularly over long term use as the wrist 420 and hand 410 cause ulnar 422 and radius 424 to pronate left of neutral, which is a non-optimal orientation as described above (note the stress on the forearm bones). Position C is likely to produce a similar strain for the user over long term use for similar reasons (ulnar and radius are supinated). Stated another way, the movement is defined by an axis parallel to the user's forearm where a neutral position is with the hand and thumb positioned "upwards" like a handshake position, and pronation and/or supination from that neutral position can introduce more stress that is typically proportion to the amount of pronation/supination and the amount of time that the hand/wrist operate in that position. An example showing a user experiencing wrist/forearm pronation while using a conventional keyboard and reduced pronation while using keyboard system 300 is presented in FIG. 5B.

Figure 4C:
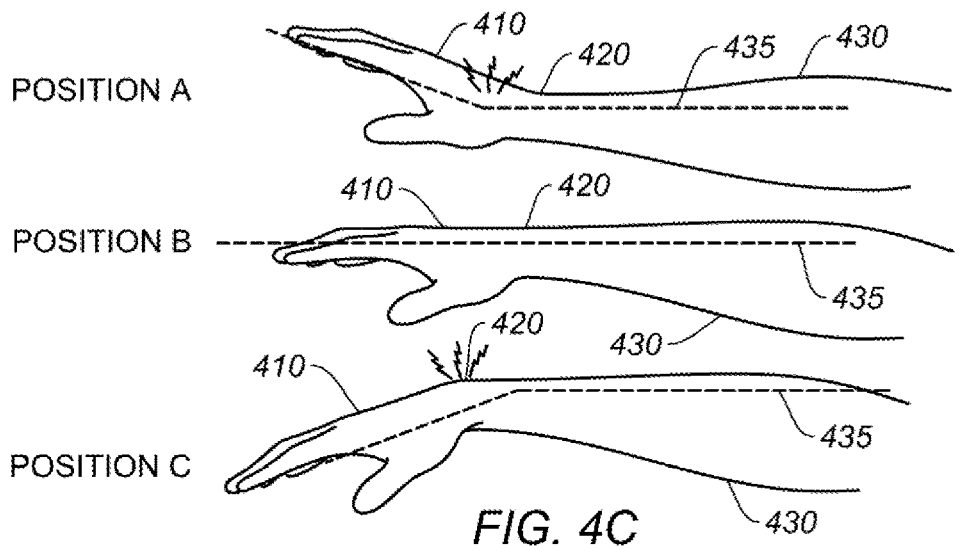
FIG. 4C shows aspects of wrist extension, which is often caused by conventional keyboard designs, and is reduced or eliminated in certain embodiments of the invention.

FIG. 4C shows aspects of wrist extension and flexion, with wrist extension often being caused by the use of conventional keyboard designs, and is reduced or eliminated in certain embodiments of the invention. Preferably, a user's hand 410 and wrist 420 should be oriented in-line with their forearm 430 (where alignment line 435 is linear), which is a neutral position and should cause the user to experience the least amount of strain, as shown in position B. Stated another way, wrist extension occurs when a user bends their wrist upward from center relative to the forearm, and wrist flexion occurs when the user bends their wrist downward from center relative to the forearm. In position A, a user's wrist is likely to experience strain, particularly over long term use as the wrist 420 and hand 410 cause hand 410 and wrist 420 to extend upwards relative to the forearm, which is a non-optimal orientation as described above (note that alignment line 435 is non-linear in this position. Position C is likely to produce a similar strain for the user over long term use for similar reasons (hand 410 and wrist 420 are experiencing flexion). An example showing a user experiencing wrist/forearm extension and flexion while using a conventional keyboard, and reduced or no flexion or extension while using keyboard system 300 is presented in FIG. 5A.

Figure 5A:
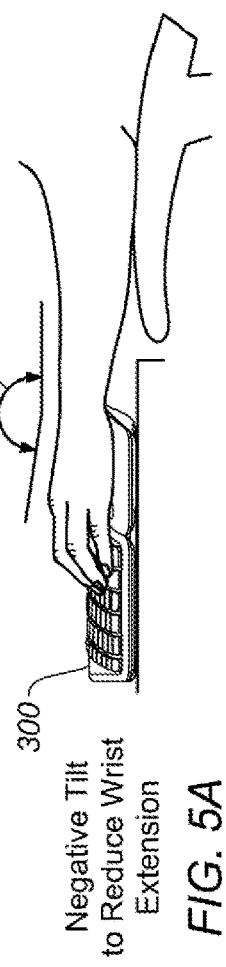
FIG. 5A shows kinematic improvements with wrist extension in an ergonomic keyboard system, according to certain embodiments.
Figure 5A:
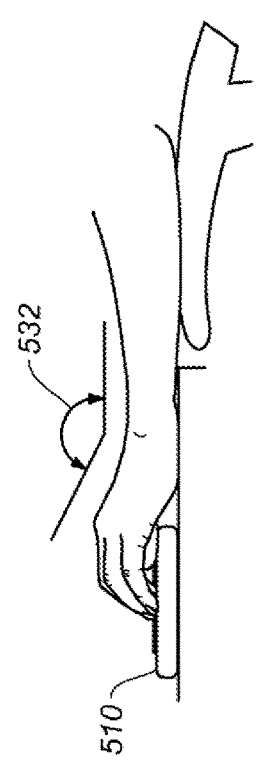
Figure 5B:
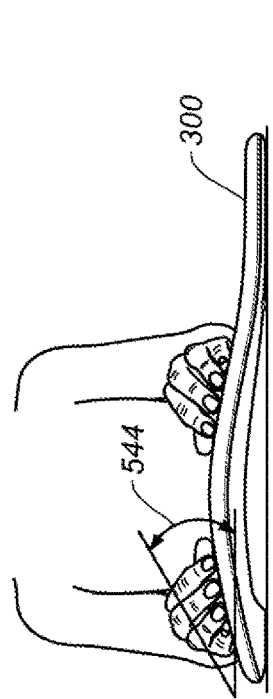
FIG. 5B shows kinematic improvements with forearm pronation in an ergonomic keyboard system, according to certain embodiments.
Figure 5B:
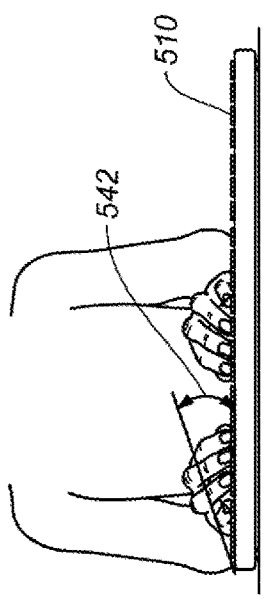
Figure 5C:
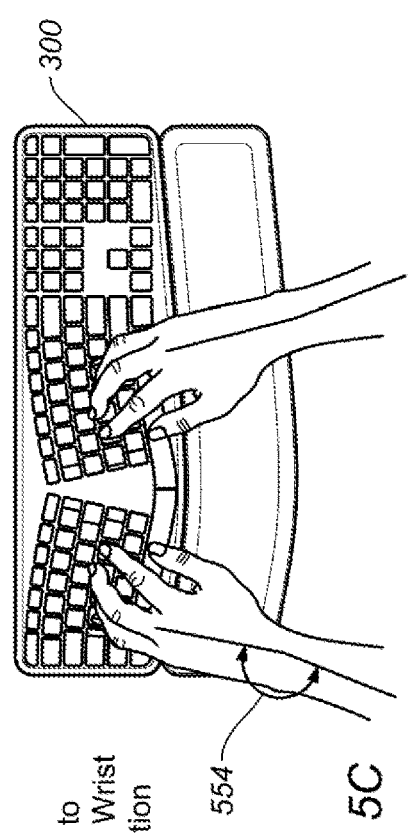
FIG. 5C shows kinematic improvements with wrist deviation in an ergonomic keyboard system, according to certain embodiments.
Figure 5C:
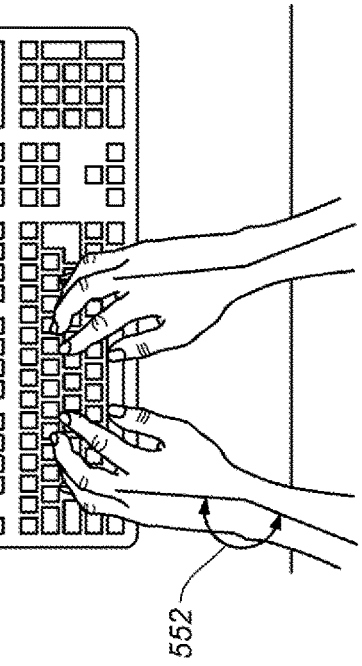

FIGS. 5A-5C show examples of kinematic improvements over contemporary keyboard designs, according to certain embodiments. In FIG. 5A, the image on the left shows a side elevation view of a user operating a standard keyboard 510. The user's wrist and forearm are resting on a table, with the user's hand extending upwards and angle 532 to interface with the keyboard keys. Over time, this hand/wrist/forearm configuration may cause strain or even long term injury (e.g., carpal tunnel syndrome). As indicated above, it is preferable to have a wrist-to-forearm angle as close to 0° as possible for minimal strain on the user. Referring back to FIG. 5A, the user on the right is using ergonomic keyboard system 300, which includes a wrist pad that support the user's wrists at a higher elevation, which can improve the wrist-to-forearm angle 534 by 10-20° compared to many conventional keyboards, and thereby reduce strain on the user. The wrist pad can be elevated such that each location along the surface contour of the wrist pad may be elevated to at least a height of corresponding key tops of the plurality of keys (e.g., the keys located at or near where the user's fingers rest—typically at least the "asdf" and "jkl;" home keys and adjacent keys), resulting in the improved wrist-to-forearm angle 534. FIG. 6, for example, shows examples of how keyboard system 300 provides kinematic improvements in wrist extension over several contemporary keyboards in the market. The wrist pad may incorporate an integrated kickstand that can introduce a negative tilt on keyboard system 300 of up to 10° (e.g., shown in 0°, −4°, and −7° configurations) in certain embodiments, as further discussed below with respect to FIG. 7. It should be noted that other alphanumeric arrangements would apply in a similar manner. For instance, in a "DVORAK" keyboard arrangement, the home keys may include the "AOEU" and "HTNS" keys. One of ordinary skill in the art with the benefit of this disclosure would appreciate the many modifications, variations, and alternative embodiments thereof.

Referring to FIG. 5B, the image on the left shows a front elevation view of a user operating a standard keyboard 510. As described above, another kinematic that can contribute to user strain is forearm pronation and/or supination over extended periods of time. Referring to FIG. 5B, the user's hands are resting on the flat keyboard 510 at a pronated angle 542 at approximately 90° off of a preferred forearm angle. In some embodiments, keyboard system 300 includes a gabled keyboard and wrist pad that allows for a reduced pronation (angle 544) in the user's forearm that reduces user stress. In some aspects, pronation can be reduced from 5-15° (from a flat position, like the standard keyboard) depending on the design of the gable. The gable can include a peak (typically between guide keys 'g' and 'h') and a slope formed along each side, which is further described below with respect to FIGS. 8-9. Wrist pad 360 follows the curvature of the layout of the keys on keyboard 310.

Referring to FIG. 5C, the image on the left shows a top plan view of a user operating a standard keyboard 510. The user is subject to wrist deviation with the user's forearms being angled inward and the user's hands and wrists being bent outward (at angle 552) to accommodate the orientation of the keys, resulting in a non-linear alignment. Aspects of the invention (e.g., keyboard system 300; the image on the right) incorporate a split in the arrangement of the keys that can reduce and in some cases eliminate wrist deviation as the wrists/hands and forearms are subject to a much smaller angle between them, with often a 5-15° reduction in certain embodiments as compared to certain contemporary keyboards. Note that the wrist pad can be contoured to follow the split between the keys. For instance, note that the angle of the wrist pad tends to match the angle of the alignment of the keys. Under the user's left hand, the keys are configured on the keyboard at an angle such that the 'f' home key is closer to the user than the 'a' home key. Under the user's right hand, the keys are configured on the keyboard at an angle such that the T home key is closer to the user than the ';' home key. The wrist pad is angled in a similar manner, as shown at least in FIG. 5C, as well as FIGS. 3A-3B and FIG. 7.

In some embodiments, wrist pad 360 may be adjustable to accommodate a large number of hand sizes. For example, wrist pad 360 may be interchangeable or may include adaptable, adjustable features like an SMP surface, or sections that can either shorten or extend the length of the wrist pad relative to the keyboard. In some embodiments, a distance between the home keys (e.g., keys 'asdf' and 'jkl;') and the end of the wrist pad is 15 cm, such that the wrist pad is contoured to follow the curvature of the keys to maintain the 15 cm (as further described below). In some embodiments, wrist pad 360 may be adjustable to increase or reduce the distance between the home keys and the wrist pad. For instance, in some embodiments, the wrist pad may be a separate entity from the keyboard and the user can place the wrist pad at any distance from the keyboard (e.g., the wrist pad may not have to be coupled to the keyboard to be self-supporting and stable). Alternatively or additionally, some embodiments may utilize magnets on foldable parts of the keyboard that pre-define the position of the wrist pad with respect to the keyboard (the magnets can couple the wrist pad with the keyboard at particular locations of the keyboard the magnetically couple with the wrist pad). In yet further embodiments, the wrist pad may be configured such that layers may be added or removed to change the height of the wrist pad relative to the keys, which could reduce wrist extension and/or flexion, as further described above.

FIG. 7 shows the use of an integrated kickstand configured to generate kinematic improvements in wrist extension in an ergonomic keyboard and wrist support system, according to certain embodiments. Keyboard system 300 includes a kickstand 365 integrated with wrist pad 360, which is shown in various configurations A-C. In configuration A, kickstand 365 is not deployed and no change is made to the tilt of wrist pad 360 with respect to keyboard 310. Note that the height of wrist pad 360 is at or higher than a height of the keyboard keys at a corresponding location on keyboard 310, as shown with lines 750, 755. That is, the height of the wrist pad is higher than the height of the keys at a same location generally along the y-axis (see FIGS. 3A-3B) and typically along the y-axis relative to the contoured x-axis, as shown in FIG. 8. This relationship can be maintained along the entirety of the (or a portion thereof, such as the locations where a user's wrists typically rest on the wrist pad) keyboard such that any location along the wrist pad will be higher than the key tops of the corresponding keys. The wrist pad is preferably configured to be higher than the keys so that when the wrist pad is compressed under the weight of a user's wrist, the user's wrist/hands are still configured at or above the keys, thereby reducing or in some cases eliminating wrist extension. In some embodiments, the wrist pad may be 5 mm or more above at least the home keys but other heights are possible (e.g., any suitable height from 0 mm-10 mm or more without the kickstand deployed). Some examples of this are seen in lines 830-839 of FIG. 8, where keys along that line (axis) correspond to location on the wrist pad along that same line. This consistent height relationship between the wrist pad and the keys is important and operates to reduce wrist extension at any location on the keyboard, as opposed to other contemporary keyboards that may have portions of a wrist pad configured to be higher than corresponding keys in some areas (e.g., near the split), but not in other areas (e.g., near the first (a, s) and last (l,;) home keys). Note that only two heights are shown in FIG. 7 per configuration to avoid cluttering the images; the heights can be maintained at every location along the wrist pad and corresponding keys on the keyboard system, or a subset thereof (e.g., the main keys 330, all keys 320, etc.), and this applies to configurations B and C below as well. Referring back to configuration A, user 710 is shown to be sitting in a chair and is subject to an improved (reduced) wrist extension angle 720 while interfacing keyboard system 300.

In configuration B, kickstand 365 is deployed and introduces a negative tilt to wrist pad 360 relative to keyboard 310. In some aspects, the negative tilt may be anywhere from 0 to −10°, and in particular embodiments −4°. In this configuration, the height of the wrist pad with respect to corresponding keys (e.g., as described above) 760, 765, is even more pronounced (e.g., approximately 1 cm, however any suitable range is possible typically within 0.5 cm to 1.5 cm). In configuration C, kickstand 365 is deployed at a steeper angle, introducing a negative tilt from −5° to −15°, and in particular embodiments, −7°. In this configuration, the height of the wrist pad with respect to corresponding keys (e.g., as described above) 770, 775, is further pronounced at about 1.5 cm (other heights are possible and typically ranges from 1-2 cm). The user 710 is shown standing at a desk with keyboard system 300 arranged with a −7° tilt (configuration C), resulting in a preferred wrist/forearm alignment angle 730 (preferably at or near 0 degrees offset between the forearm and wrist/hand). Note that kickstand 365 may be a single kickstand that can be adjusted to any suitable tilt ranging from 0 to −15°, or other suitable range. In some cases, kickstand 365 may be multiple kickstands, with each kickstand providing a set negative tilt. For instance a first kickstand may incorporate a −4° tilt, and a second kickstand may incorporate a −7° tilt, as described above. In some embodiments, the height of the wrist pad when the kickstand is not deployed (e.g., configuration A) is approximately 48 mm high (e.g., from a flat underlying work surface, as shown for instance when placed on a desk), although other measurements are possible (e.g., 45-55 mm) depending on the dimensions (height) of the keys, as would be appreciated by one of ordinary skill in the art with the benefit of this disclosure. In some aspects, the height of the wrist pad with kickstand deployed with a 4 degree tilt (e.g., configuration B) may be between 48-70 mm, and with a 7 degree tilt (e.g., configuration C), about 70 mm above the underlying flat work surface. In certain embodiments, a distance between the highest point of the of the wrist pad to the top surface of the keys (in configuration A—no kickstand deployed), where the space bar (and in some cases function keys F6/F7) is approximately 4.5 mm. For the Home keys, such as keys 'F' and 'J', the distance is approximately 9 mm. One of ordinary skill in the art with the benefit of this disclosure would appreciate the many modifications, variations, and alternative embodiments thereof.

Figure 8:
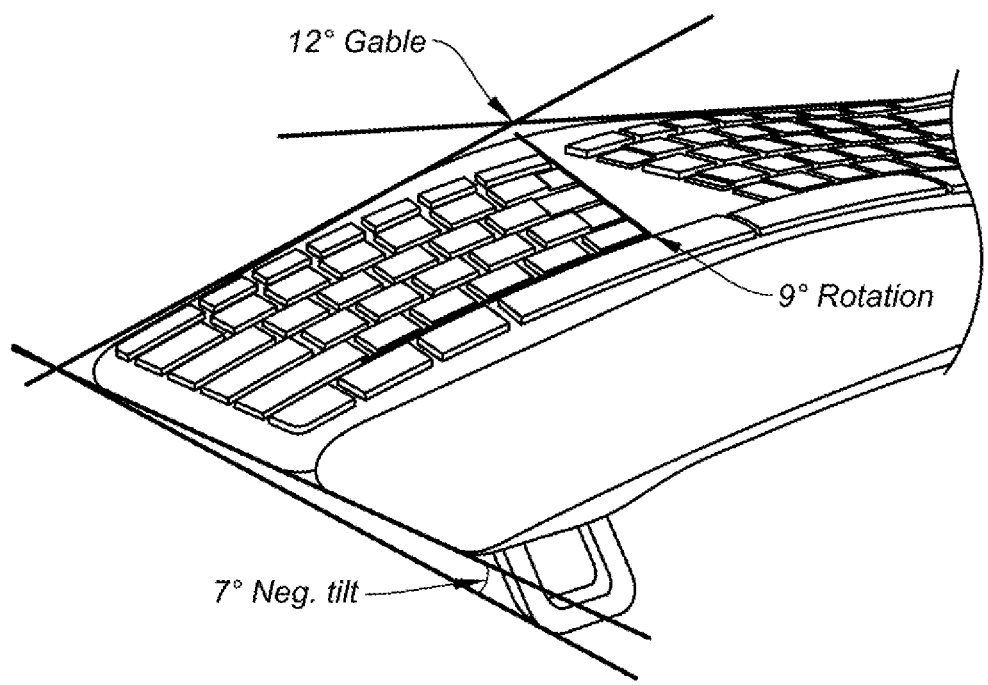
FIG. 8 shows aspects of a gabled keyboard and wrist pad for an ergonomic keyboard system, according to certain embodiments.
Figure 8:
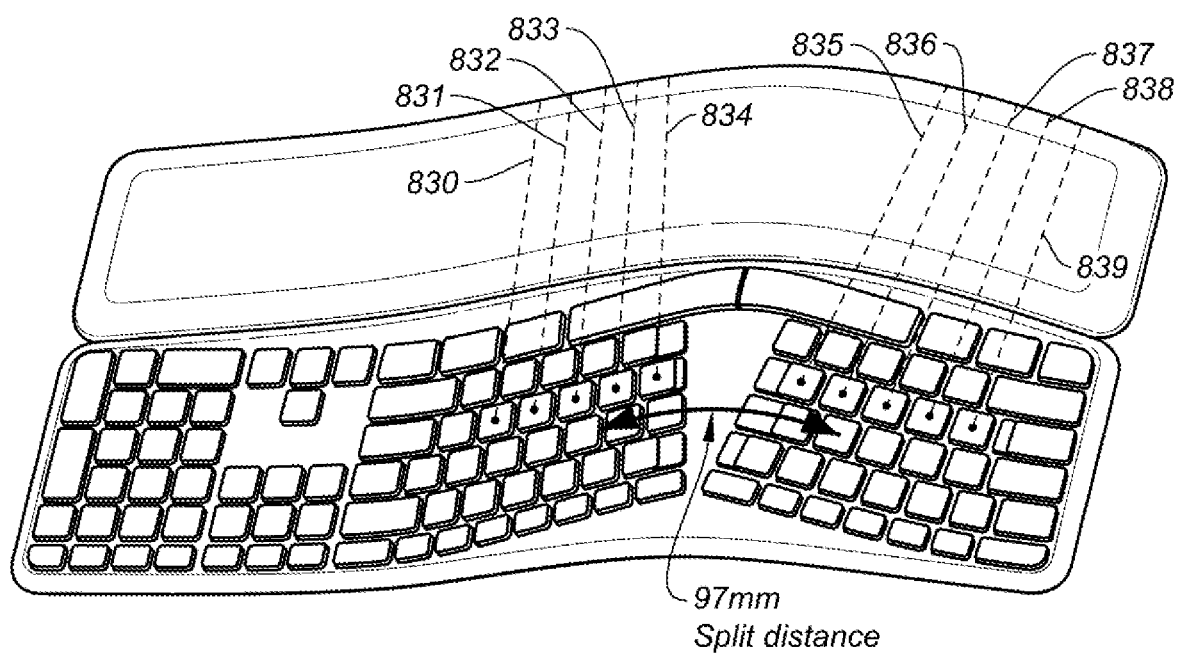

FIG. 8 shows aspects of a gabled keyboard and wrist pad for an ergonomic keyboard system 300, according to certain embodiments. In the top image, the keyboard 310 and corresponding wrist pad 360 have a 12° gable with a 9° key frame rotation, as opposed to 8° or less, which can be found in some contemporary keyboards. In some embodiments, there may be a 97 mm split distance between the 'f' and 'j' home keys, as shown in the bottom image. In the orientation shown, the wrist pad 360 is boosted at a negative angle of 7° to further reduce or eliminate wrist extension. Keys 334 on the left side of the split may be configured at a 13° slope, and keys 336 on the right side of the split may be configured at 11°, which is better represented in FIG. 9. The placement of the keys and the wrist pad may be such that the distance between the center of each of the keys in the home key row and the end of the wrist pad may be 15 cm, which is determined to be a preferred dimension for improved ergonomic performance (e.g., key distances to wrist pad 830-839). However, other distances may be used (e.g., anywhere from 12-18 cm, which may depend on the size of the keys (key pitch), the size of the user's hands, etc.), as would be appreciated by one of ordinary skill in the art with the benefit of this disclosure. In some embodiments, the center of home keys "asdf" and "jkl;" are 15 cm from the end of the wrist pad. The distance is measured along a line defined by the orientation of the key, which typically also corresponds to the orientation of the user's hands/wrists while keyboard system 300 is in use, as shown in FIG. 5C for example. In some cases, the distance between the home keys and the end of the wrist pad may vary between 150 mm and 155 mm, and wider ranges are possible in certain implementations. For example, in some implementations configured for small hands, the distance may be as low as 90 mm, but generally 100 mm to 155 mm is a preferred range over a range of wrist pad sizes, with the exemplary distance for universal use is 150-155 mm. In some aspects, the "home row" (also referred to as the "C" row) may maintain the approximately 150-155 mm out to the ends of the keyboard. For instance, the distance from the "home" number key '5' to the end of the wrist pad may be approximately 150 mm. In embodiments that have a configurable or interchangeable wrist pad, the distance between the center of the home keys and the end of the wrist pad (as shown in FIG. 8) may preferably range from 100-155 mm depending on the size of the user's hands, as would be appreciated by one of ordinary skill in the art with the benefit of this disclosure. The keys adjacent to the split may have offset surfaces ("stepped" surfaces) to reinforce finger muscle memory. In some cases, non-stepped variants may result in the user typing at a different location on the key with each strike given the large surface area, which can reduce typing accuracy. By limiting the strike location (the top-most stepped surface), the user's key presses are limited to a smaller surface area, which can maintain typing accuracy. In some embodiments, the square shaped key surfaces are 18.5 mm×18.5 mm. In some aspects, the travel of the keys may be about 1.8 mm, although other ranges are possible, as would be appreciated by one of ordinary skill in the art with the benefit of this disclosure. The split keyboard is configured such that there is 102 mm between the center of the 'j' key and the center of the backspace key, and 92 mm between the center of the 'j' key and the center of the 'enter' key. In some embodiments, the width of the wrist pad may be approximately 92 mm, although other dimensions are possible and may range up to +/−10 mm or more. Note that the measurements provided above are for particular embodiments, and other measurements and/or ranges are possible that still provide the kinematic/ergonomic advantages described herein. For example, key tops may have smaller or larger pitches (e.g., 18 $mm^2$, 19 $mm^2$, or other size or square/non-squared dimension). In some cases, the angle of the gable may be less than or greater than 12 degrees (e.g., 13 degrees, etc., although at least 12 degrees is preferred). Note that greater angles with respect to the gable may produce a further reduced pronation of the user's wrist, however it may not give a suitable aesthetic result according to user design preferences.

Figure 9:
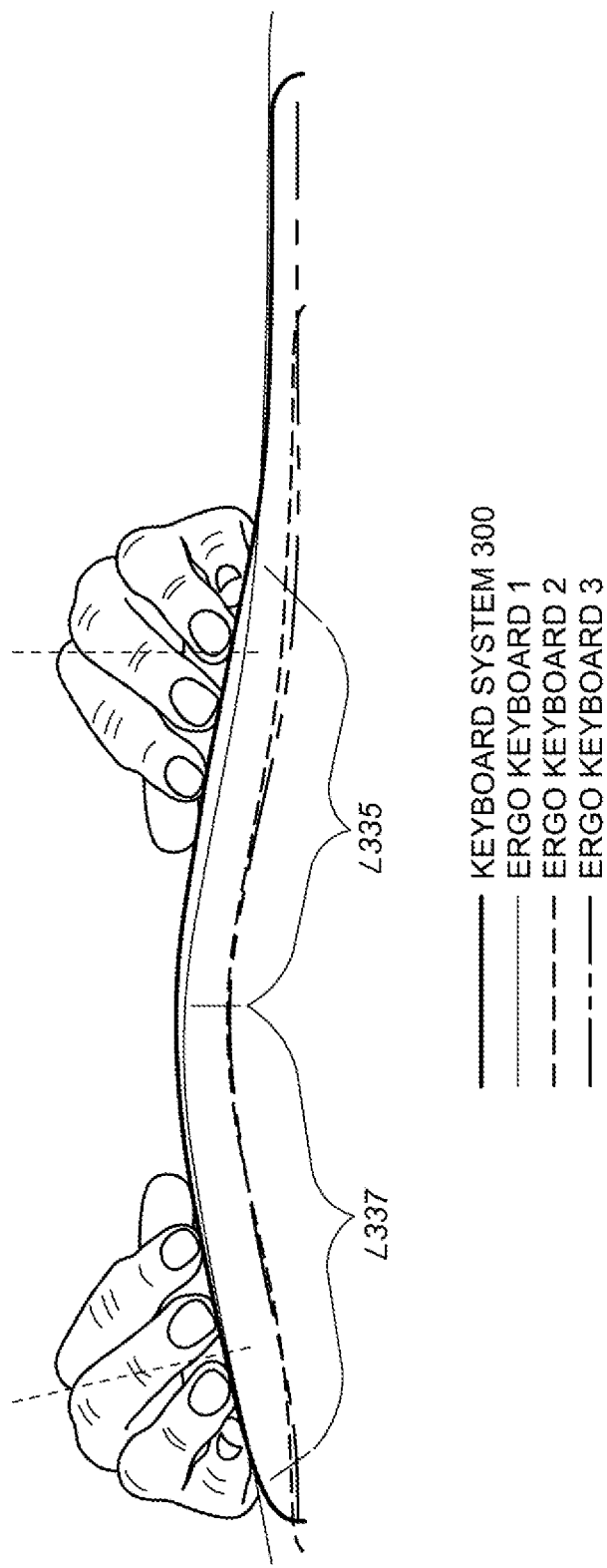
FIG. 9 shows a rear view of keyboard system with emphasis on the gabled portion, according to certain embodiments.

FIG. 9 shows a rear view of keyboard system 300 with emphasis on the gabled portion, according to certain embodiments. As described above, the gable allows the user's wrist and hand to rest in a more neutral position (less pronation) than other conventional keyboards. Referring to FIG. 9, the gable is more pronounced than several leading contemporary ergonomic keyboards on the market, shown as ergo keyboards 1-3. Note that the gabled portion in the other keyboards flatten out where the user rests their wrists such that the user benefits very little from the gable and at least a portion of their hands and wrists are subject to more pronation than would otherwise occur if their hands were located at the gabled portion. This renders the gables for ergo keyboards 2 and 3 mostly ineffective as the user benefits very little ergonomic advantage from the gabled portion. Note that keyboard system 300 has the most prominent gable, and the slopes formed by the gable are maintained (e.g., within 1-2°) throughout most of the keyboard (e.g., all of keys 330, the home keys, or any suitable group of keys as would be appreciated by one of ordinary skill in the art with the benefit of this disclosure) such that all of the surface area of the user's hands/wrists that rest on the wrist pad benefit from their more neutral position (e.g., less pronation). Other keyboards do not maintain the gable throughout the keys, as can be seen in FIG. 9. Furthermore, the gable of the keyboard extends through the wrist pad. That is, the wrist pad (360) also includes a gable that matches or substantially matches (e.g., within 1-2°) the gable of the keyboard (310), as the posture of the wrist can be primarily oriented by the wrist pad and not necessarily the keyboard or at least the keyboard orients the hands to a markedly lesser extent. In some embodiments, slopes 335 and 337 may be constant or may change throughout the range of the slope.

Figure 10:
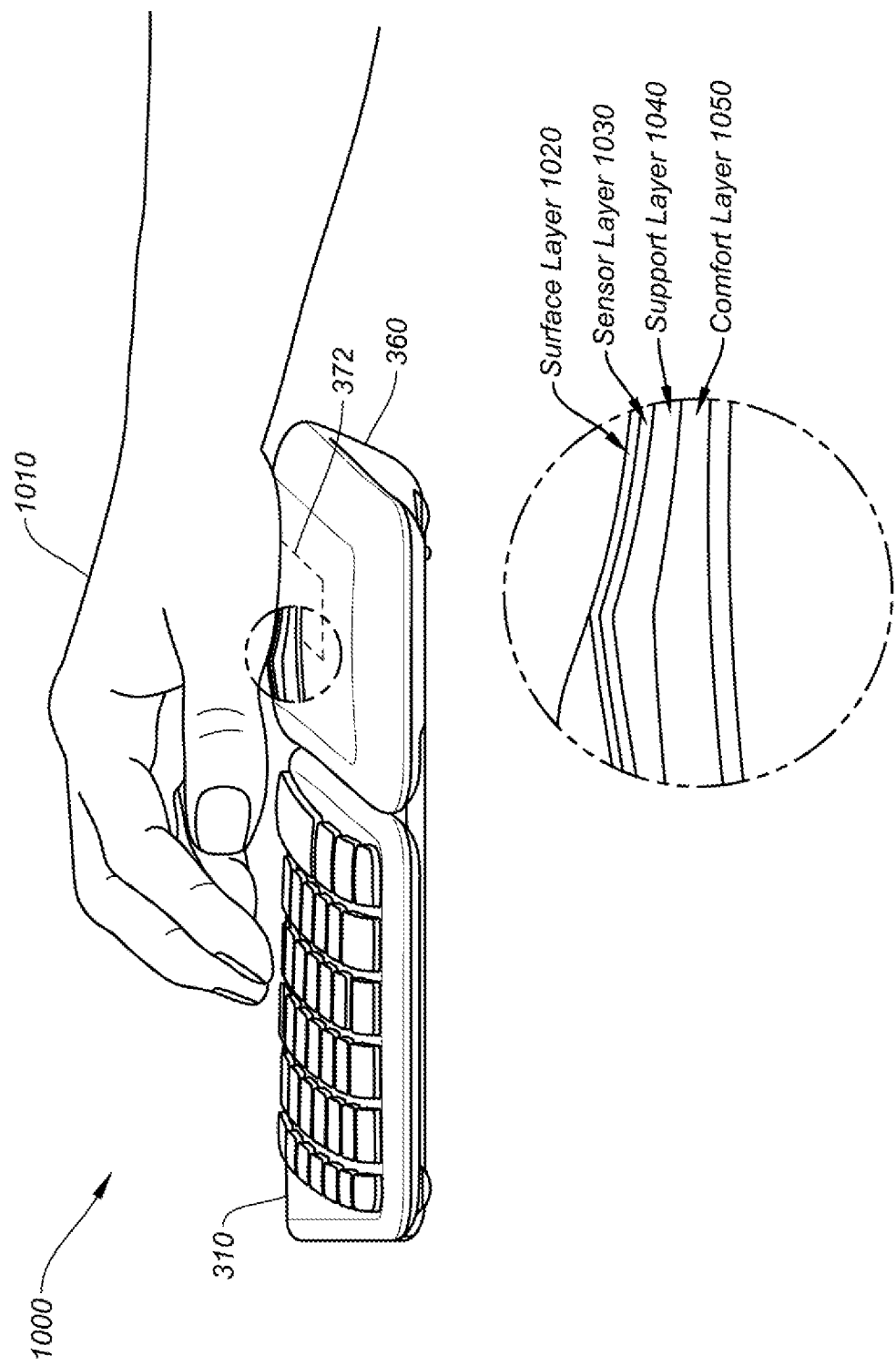
FIG. 10 shows aspects of an embedded sensor array in an ergonomic keyboard system, according to certain embodiments.

FIG. 10 shows a simplified diagram 1000 presenting aspects of an embedded sensor array in an ergonomic keyboard system 300, according to certain embodiments. User 1010 is resting their wrist on wrist pad 360, which may include one or more sensors 372, which may be comprised of a surface layer 1030, sensor layer 1030, support layer 1040, and comfort layer 1050. Sensors 372 may be used to detect when the keyboard system is in use, the amount of time that keyboard system 300 is in use and corresponding timing metrics, how the user's hands shift position over time, how the hands shift with respect to certain key stroke characteristics (e.g., trends in key presses and corresponding kinematics associated therewith, such as whether a user performs non-optimal ergonomic movements when certain keystrokes or combination of keystrokes are performed), aspects of the user's posture based on the detected weight, user vital signs (e.g., user pulse measured at the wrists where contacting the wrist pad), and the like, which could be used to understand user stress levels or allow the system to detect sub-optimal postures or keyboard system 300 engagement and offer recommendations to reduce user stress and improve productivity.

In some aspects, an inertial measurement unit (IMU) may be incorporated into the wrist pad or keyboard portion and can be configured to detect the angle of the keyboard. This information can be used by the processor(s) 210 to determine if that keyboard has a kickstand deployed and at what angle. Alternatively or additionally, the kickstand may have one or more sensors to detect when it is deployed. Software operating on the keyboard system or remotely (e.g., host computer) can utilize the sensor and IMU data to detect a person's posture and recommend keyboard configurations (e.g., kickstand configurations) to improve the user's kinematics. In some embodiments, touch sensors may be embedded in the wrist pad and/or portions of the keyboard (e.g., in the keys, areas around key arrays, etc.). Alternatively or additionally, some implementations may incorporate pressure detection sensors (e.g., strain gauge, piezoelectric-based sensors, resistive sensors, etc.) to detect where a user is contacting the wrist pad and to detect a weight distribution of the user's hands/palms/wrists on the surface of the wrist pad. The IMU, pressure detection sensors, or any other sensor described herein may be controlled by one or more aspects of system 200 (e.g., processor 210, input detection system 250, etc.)

In some embodiments, the wrist pad may be removable, as shown in FIG. 3B, such that other wrist pads can be interchanged. Some embodiments may employ different types of foams with different densities or properties such as improved cooling properties, or different fabric materials with improved grip or feel. In some cases, a coating or covering with a directionally dependent friction may be employed to allow users to move easily move their wrists/palms along the surface of the wrist pad in a forward/backward direction, but resist movements along the surface in a left/right direction with greater friction/resistance. Some embodiments may include moisture resistant materials, memory foam, and/or shape memory polymers. Any combination of materials, sensor configurations, layer configurations, etc., may be employed, as would be appreciated by one of ordinary skill in the art with the benefit of this disclosure.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An ergonomic keyboard apparatus comprising:
    a keyboard frame including a non-planar, ergonomic contour defined in part by a gabled portion of the keyboard frame that is pitched into a contoured peak that forms:
       a first non-planar slope on a first side of the keyboard frame that slopes from the first side up towards the contoured peak of the gabled portion along a first axis that traverses a left to right side of the keyboard; and
       a second non-planar slope on a second side of the keyboard frame that slopes from the second side up towards the contoured peak of the gabled portion along the first axis;
    a plurality of keys housed by the keyboard frame, wherein the plurality of keys are disposed within the keyboard frame such that key tops of each of the plurality of keys follow the non-planar, gabled, ergonomic contour of the keyboard frame; and
    a wrist pad coupled to the keyboard frame, the wrist pad having a gabled center portion and a surface contour that corresponds to the non-planar ergonomic contour of the keyboard frame defined by the gabled portion, the non-planar first slope, and the non-planar second slope of the keyboard frame,
    wherein at least a portion of the surface contour of the wrist pad is at least at a height of corresponding key tops of the plurality of keys located relative to the wrist pad along a second axis substantially orthogonal to the first axis, the second axis traversing a front to back side of the keyboard, wherein the at least a portion of the surface contour corresponds to an area configured to support a user's wrists or palms while the ergonomic keyboard apparatus is in use.

2. The ergonomic keyboard apparatus of claim 1 wherein the wrist pad includes:
    a first wrist support region; and
    a second wrist support region, the first and second wrist support region configured to support a user's wrists while the ergonomic keyboard apparatus is in use,
    wherein the first and second slopes of the keyboard frame and the wrist pad are at least |10°| at their steepest sections, and wherein the first and second wrist support regions maintain at least a 2 degree slope throughout.

3. The ergonomic keyboard apparatus of claim 1 wherein the wrist pad is configured to be non-destructively detachable from and re-attachable to the contoured keyboard.

4. The ergonomic keyboard apparatus of claim 3 wherein the wrist pad is configured such that a distance between the wrist pad and the plurality of keys is adjustable.

5. The ergonomic keyboard apparatus of claim 1 wherein the wrist pad includes a front portion that couples to the keyboard frame and a rear portion opposite to the front portion, and wherein the wrist pad includes an integrated and adjustable kickstand configured to pitch the rear portion of the wrist pad relative to the front portion along the second axis when the kickstand is deployed.

6. The ergonomic keyboard apparatus of claim 5 wherein the adjustable kickstands pitches the rear portion of the wrist pad up to 7°.

7. The ergonomic keyboard apparatus of claim 1 comprising one or more sensors embedded within the wrist pad, the one or more sensors configured to:
    detect a location of the user's wrists while the keyboard is in use; and
    detect whether the integrated kickstand is deployed.

8. The ergonomic keyboard apparatus of claim 1 wherein the pitch of the contoured peak of the gabled center portion is adjustable.

9. The ergonomic keyboard apparatus of claim 1 wherein the wrist pad is detachable from the keyboard frame and is foldable.

10. The ergonomic keyboard apparatus of claim 1 wherein the plurality of keys includes at least one set of home keys, wherein a center of each home key of the at least one set of home keys is 15 cm from a bottom edge of the surface contour of the wrist pad at a location in-line with a line defined by an orientation of the corresponding home key.

11. The ergonomic keyboard apparatus of claim 10 wherein the home keys are alphanumeric keys including "a", "s", "d", "f", "j", "k", "l", and ";" keys in a QWERTY keyboard layout.

12. The ergonomic keyboard apparatus of claim 11 wherein a typing surface of each of the home keys has an 18.5 mm by 18.5 mm pitch.

13. The ergonomic keyboard apparatus of claim 12 wherein there is 102 mm distance between a center of the 'j' home key and the center of a 'backspace' key, and 92 mm distance between the center of the 'j' key and a center of an 'enter' key.

14. An apparatus comprising:
    a wrist pad configured to be coupled to an ergonomic keyboard, the wrist pad having a gabled center portion and a surface contour that corresponds to an ergonomic contour of the keyboard,
    wherein the gabled portion of the wrist pad is pitched into a contoured peak that forms:
       a first slope on a first side of the wrist pad that slopes from the first side up towards the contoured peak of the gabled portion along a first axis that traverses a left to right side of the keyboard; and
       a second slope on a second side of the wrist pad that slopes from the second side up towards the contoured peak of the gabled portion along the first axis,
    wherein at least a portion of the surface contour of the wrist pad is elevated to at least a height of corresponding key tops of a plurality of keys disposed in the ergonomic keyboard and located relative to the wrist pad along a second axis substantially orthogonal to the first axis on the ergonomic keyboard, the second axis traversing a front to back side of the keyboard, wherein the at least a portion of the surface contour corresponds to an area configured to support a user's wrists or palms while the ergonomic keyboard is in use.

15. The apparatus of claim 14 wherein the wrist pad includes:
    a first wrist support region; and
    a second wrist support region, the first and second wrist support region configured to support a user's wrists while the ergonomic keyboard is coupled to the wrist pad and in use,
    wherein the first and second slopes of the wrist pad are at least |10°| at their steepest sections, and wherein the first and second wrist support regions maintain at least a 2 degree slope throughout.

16. The apparatus of claim 14 wherein the wrist pad is configured to be non-destructively detachable from and re-attachable to the contoured keyboard.

17. The apparatus of claim 14 wherein the wrist pad is configured such that a distance between the wrist pad and the ergonomic keyboard is adjustable.

18. The apparatus of claim 14 wherein the wrist pad includes a front portion that couples to the ergonomic keyboard and a rear portion opposite to the front portion, and wherein the wrist pad includes an integrated and adjustable kickstand configured to pitch the rear portion of the wrist pad relative to the front portion when the kickstand is deployed.

19. The apparatus of claim 18 wherein the adjustable kickstand pitches the rear portion of the wrist pad up to 7°.

20. The apparatus of claim 18 comprising one or more sensors embedded within the wrist pad, the one or more sensors configured to:
- detect a location of the user's wrists while the keyboard is in use; and
- detect whether the integrated kickstand is deployed.

* * * * *